A. D. MOULIN.
MOTORCYCLE ENGINE STARTER.
APPLICATION FILED AUG. 26, 1920.
1,394,753.
Patented Oct. 25, 1921.
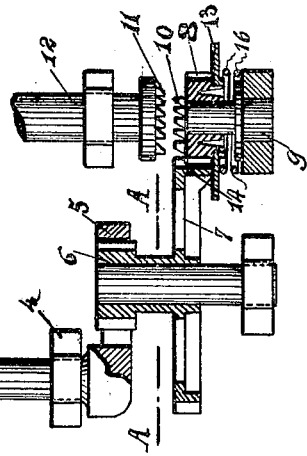
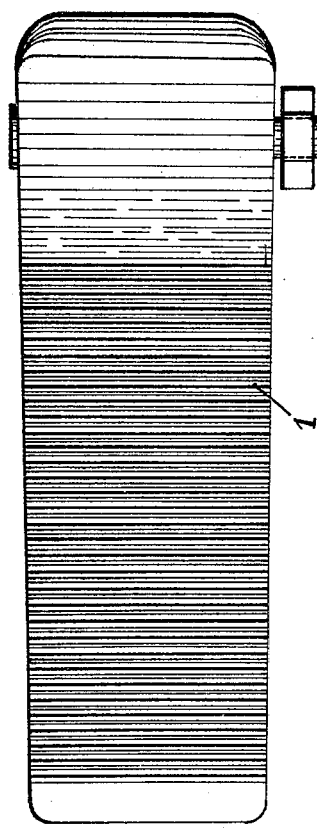
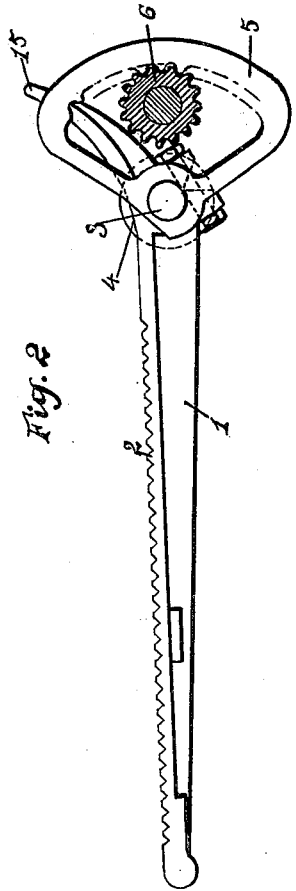
Inventor
Auguste Désiré Moulin.
By B. Singer, Atty.

UNITED STATES PATENT OFFICE.

AUGUSTE DÉSIRÉ MOULIN, OF PARIS, FRANCE.

MOTORCYCLE-ENGINE STARTER.

1,394,753.  Specification of Letters Patent.  Patented Oct. 25, 1921.

Application filed August 26, 1920. Serial No. 406,261.

*To all whom it may concern:*

Be it known that I, AUGUSTE DÉSIRÉ MOULIN, a citizen of the Republic of France, residing at #37 Boulevard Brune, Paris, France, have invented new and useful Improvements in Motorcycle-Engine Starters, of which the following is a specification.

This invention relates to motor cycle engine starters operated by the foot rest.

According to this invention the engine shaft is driven from the foot-rest through an increased ratio gearing and a clutch, and an incline or cam member carried by one of the elements of the starting mechanism throws the clutch out of action when the foot-rest is at the end of its travel.

A construction according to the present invention is illustrated by way of example in the accompanying drawings, in which—

Figure 1 is a plan partly in section and

Fig. 2 is a side elevation partly in section on line A—A of Fig. 1.

A foot-rest 1 with a suitably corrugated tread 2 is mounted on a spindle 3 supported in bearings 4 and is provided with an upward extension 15 which enables the driver to raise the said foot-rest with the foot whenever required.

The foot-rest 1 is rigidly connected to an internally toothed sector 5 meshing with a pinion 6 integral with a toothed wheel 7 meshing in turn with a pinion 8 loosely mounted on a journal 9 secured to the frame, and axially displaceable on the said journal. The outer lateral face of the pinion 8 is provided with claw teeth 10 adapted to engage another set of similar teeth 11 carried by the engine shaft 12, for the purpose of driving the latter in one direction only. The pinion 8 is provided with an annular flange 13 adapted to come into contact with an incline or cam member 14 secured to the toothed wheel 7. A spring 16 tends to press the flange 13 against the cam member 14.

The starter works as follows:

The foot-rest is put in its raised position and forcibly lowered by the driver's foot for the purpose of oscillating the sector 5 which rotates the pinion 6 operating in turn the gears 7—8; the claw teeth 10 then come into engagement with the teeth 11 since the cam member 14 is not opposite the flange 13 when the foot-rest is in its raised position. As soon as the engine is started the teeth 11 ride over the teeth 10 and do not drive them. Moreover at the end of the travel of the foot-rest the cam member 14 thrusts the flange back and disengages the teeth 10 from the teeth 11.

This starter is perfectly reliable and very simple in construction. The invention is not limited to the starter as illustrated; for instance, the clutch may be thrown out of operation by any desired means without departing from the scope of the said invention.

I claim—

1. In combination with the shaft of an internal combustion motor, a clutch member on said shaft, a gear mounted for rotation and for movement to and from the clutch member and having means to engage said clutch member and also having a flange, a gear mounted for rotation, engaged with the first named gear and having a cam to contact with the flange of the first named gear, a pinion revoluble with the second named gear, and a lever having a sector engaged with said pinion.

2. In combination with the shaft of an internal combustion motor, a clutch member on said shaft, a gear mounted for rotation and for movement to and from the clutch member and having means to engage said clutch member, and also having a flange, a spring to move the said gear to engaged position, a gear mounted for rotation, engaged with the first named gear and having a cam to coact with the flange of the first named gear, a pinion revoluble with the second named gear, and a lever having a sector engaged with said pinion.

In witness whereof I affix my signature.

A. D. MOULIN.

Witnesses:
 EDMOND BRUIDANT,
 JACQUES LANDREAU.